United States Patent
Maus et al.

(10) Patent No.: US 11,334,081 B2
(45) Date of Patent: May 17, 2022

(54) VEHICLE ANOMALOUS-CONDITION RESPONSE DURING AUTONOMOUS DRIVING

(71) Applicant: Ford Global Technologies, LLC, Dearborn, MI (US)

(72) Inventors: Benjamin Maus, Düsseldorf (DE); Dhivya Srinivasan, Royal Oak, MI (US); Jens Kotte, Geilenkirchen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 160 days.

(21) Appl. No.: 16/824,767

(22) Filed: Mar. 20, 2020

(65) Prior Publication Data
US 2021/0294336 A1 Sep. 23, 2021

(51) Int. Cl.
*G05D 1/02* (2020.01)

(52) U.S. Cl.
CPC ... *G05D 1/0214* (2013.01); *G05D 2201/0212* (2013.01); *G05D 2201/0213* (2013.01)

(58) Field of Classification Search
CPC ......... G05D 1/0214; G05D 2201/0212; G05D 2201/0213; B60W 60/00
USPC ..................................................... 701/23, 25
See application file for complete search history.

(56) References Cited

U.S. PATENT DOCUMENTS

| 10,156,849 | B1 | 12/2018 | Zych | |
|---|---|---|---|---|
| 10,254,121 | B2 | 4/2019 | Stentz et al. | |
| 2015/0345964 | A1* | 12/2015 | Oooka | B60W 30/16 701/41 |
| 2019/0300007 | A1* | 10/2019 | Hilligardt | B60W 50/0205 |
| 2019/0344799 | A1* | 11/2019 | Tiwari | B60W 10/18 |
| 2020/0094850 | A1* | 3/2020 | Chi | B60W 60/00253 |

FOREIGN PATENT DOCUMENTS

WO 2018010891 A1 1/2018

* cited by examiner

*Primary Examiner* — Nadeem Odeh
(74) *Attorney, Agent, or Firm* — Frank A. MacKenzie; Bejin Bieneman PLC

(57) ABSTRACT

A computer includes a processor and a memory storing instructions executable by the processor. The instructions include to rank a list of minimal risk maneuvers for a vehicle by expected risk score; for each minimal risk maneuver, update a distance from a present location of the vehicle to a respective end location, wherein each end location satisfies a minimal risk condition corresponding to the respective minimal risk maneuver; in response to a first anomalous condition selected from a set of anomalous conditions, determine a distance limit based on the first anomalous condition; then select the minimal risk maneuver ranked best for the expected risk score from the minimal risk maneuvers for which the respective distances are below the distance limit; and then instruct the vehicle to perform the selected minimal risk maneuver.

20 Claims, 3 Drawing Sheets

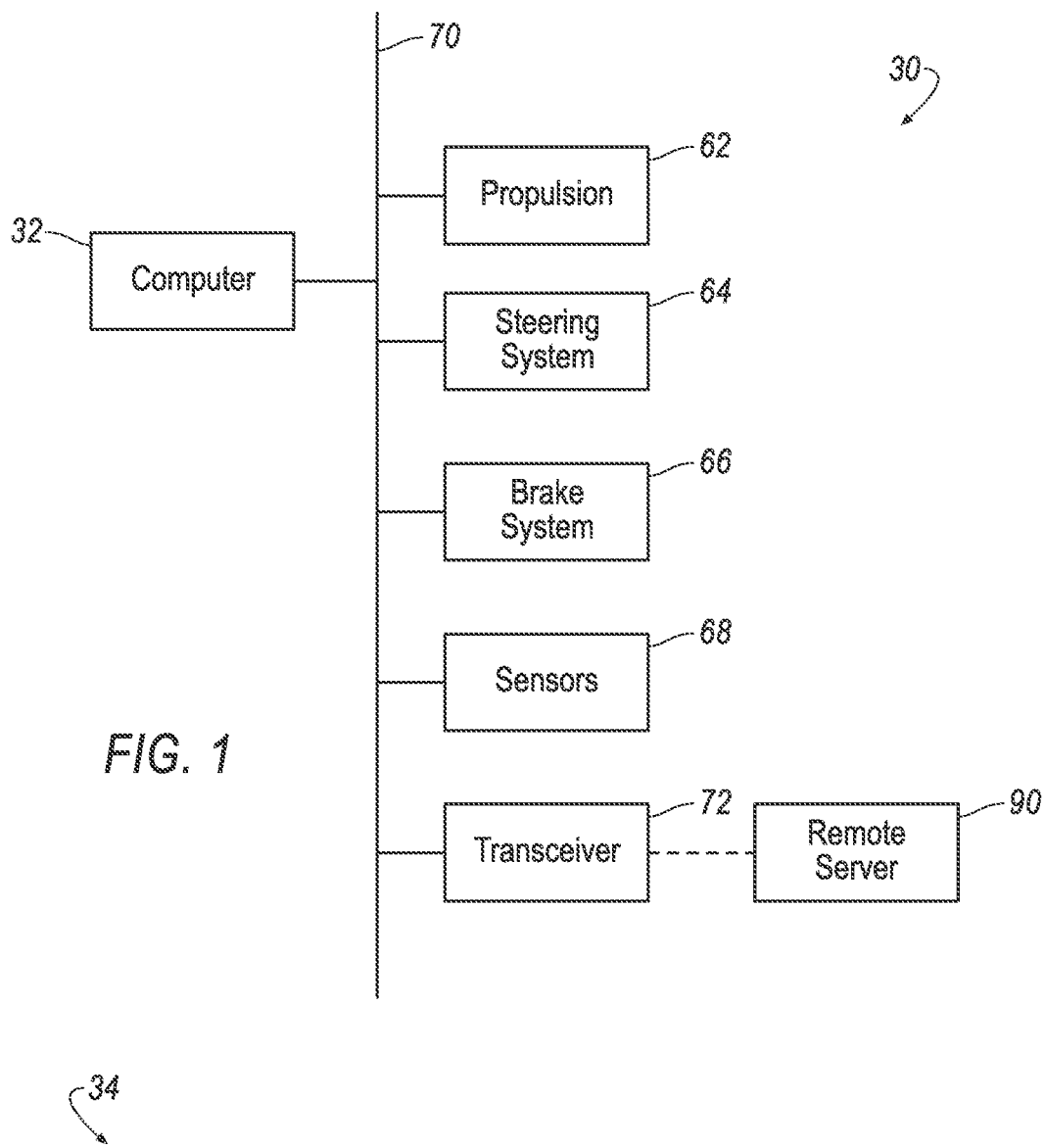

VEHICLE ANOMALOUS-CONDITION RESPONSE DURING AUTONOMOUS DRIVING

BACKGROUND

An autonomous mode for a vehicle is one in which each of a propulsion, a brake system, and a steering system of the vehicle are controlled by a vehicle computer; in a semi-autonomous mode, the vehicle computer controls one or two of the propulsion, braking, and steering. By way of context, the Society of Automotive Engineers (SAE) has defined multiple levels of autonomous vehicle operation. At Levels 0-2, a human driver monitors or controls the majority of the driving tasks, often with no help from the vehicle. For example, at Level 0 ("no automation"), a human driver is responsible for all vehicle operations. At Level 1 ("driver assistance"), the vehicle sometimes assists with steering, acceleration, or braking, but the driver is still responsible for the vast majority of the vehicle control. At Level 2 ("partial automation"), the vehicle can control steering, acceleration, and braking under certain circumstances without human interaction. At Levels 3-5, the vehicle assumes more driving-related tasks. At Level 3 ("conditional automation"), the vehicle can handle steering, acceleration, and braking, as well as monitoring of the driving environment, under certain circumstances. Level 3 requires the driver to intervene occasionally, however. At Level 4 ("high automation"), the vehicle can handle the same tasks as at Level 3 but without relying on the driver to take over in certain driving modes. At Level 5 ("full automation"), the vehicle can handle almost all tasks without any driver intervention.

In some situations, e.g., in SAE Level 3, the vehicle computer may need to hand over control to the human driver when certain conditions arise, such as leaving a geofenced area, exiting a freeway, entering a construction zone, etc. If the human driver does not take control of the vehicle sufficiently quickly, the vehicle computer will need to perform some manner of response. Moreover, an anomalous condition may arise in which the vehicle computer has insufficient time to hand over control to the human driver, also necessitating a response.

BRIEF DESCRIPTION OF THE DRAWINGS

FIG. 1 is a block diagram of an example vehicle.

FIG. 2 is a diagram of a list of minimal risk maneuvers.

DETAILED DESCRIPTION

Figure 3:
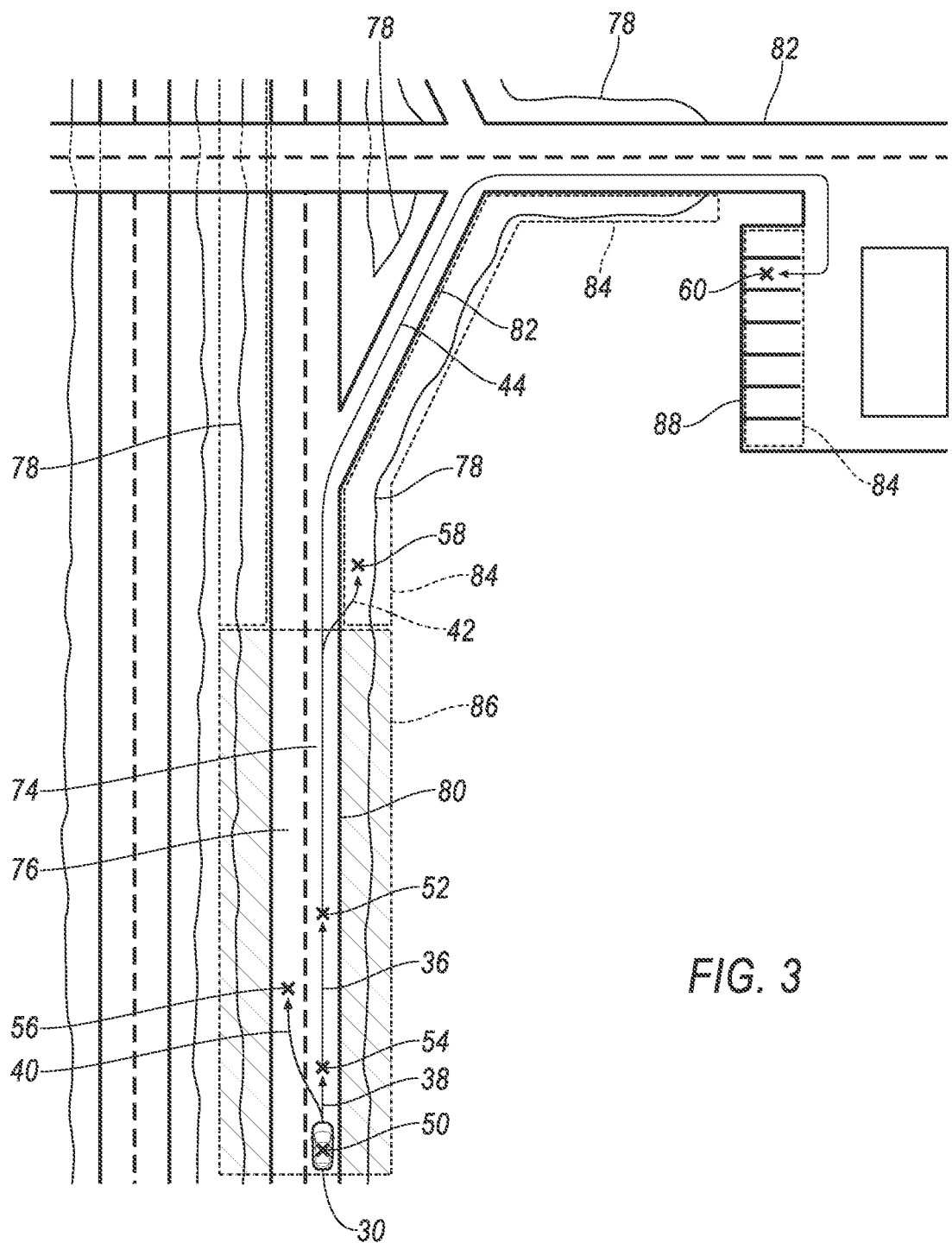
FIG. 3 is a diagram of a map showing hazards and eligible areas for end locations of the minimal risk maneuvers.

The system described herein provides a response to an anomalous condition or a handoff failure in an autonomous or semi-autonomous vehicle that is potentially safer and/or better tailored to a vehicle's current situation than an existing strategy of stopping the vehicle in a current lane of travel. A vehicle computer can select from a number of minimal risk maneuvers to respond to an anomalous condition based on the nature of the anomalous condition as well as the urgency of the anomalous condition. The system can thus choose a slower but potentially safer minimal risk maneuver under certain circumstances or a quicker minimal risk maneuver under other circumstances. The response is also more customized by accounting for whether particular hazards are present and might interact with the selected minimal risk maneuver. The system thus may make certain vehicle operations, such as according to SAE Level 3 autonomy, more feasible and/or expand the range of circumstances in which a vehicle can perform such operations, e.g., be in a Level 3 autonomous mode.

A computer includes a processor and a memory storing instructions executable by the processor to rank a list of minimal risk maneuvers for a vehicle by expected risk score; for each minimal risk maneuver, update a distance from a present location of the vehicle to a respective end location, wherein each end location satisfies a minimal risk condition corresponding to the respective minimal risk maneuver; in response to a first anomalous condition selected from a set of anomalous conditions, determine a distance limit based on the first anomalous condition; then select the minimal risk maneuver ranked best for the expected risk score from the minimal risk maneuvers for which the respective distances are below the distance limit; and then instruct the vehicle to perform the selected minimal risk maneuver.

The set of anomalous conditions may include a failure of a driver to reengage control of the vehicle from an autonomous mode within a time limit. The instructions may further include to operate the vehicle in the autonomous mode, and to prompt the driver to reengage control of the vehicle upon determining that the vehicle will enter an area that fails to satisfy at least one operating condition for the autonomous mode. The at least one operating condition may be a road type. The road type may be a controlled-access road.

The operating condition may be a lack of a construction zone.

The instructions may further include, for at least one of the minimal risk maneuvers, to select the end location based on a distance from the present location of the vehicle to the end location and based on a lack of hazards from a hazard list at the end location. The instructions may further include to receive map data that includes indications of hazards from the hazard list. The instructions may further include to select the end locations from the map data.

The instructions may further include to determine eligible areas for at least one end location based on a lack of hazards from the hazard list.

A first minimal risk maneuver on the list of minimal risk maneuvers may be traveling from a controlled-access road on which the vehicle is currently traveling to a first end location, and the instructions may further include to select the first end location such that the first end location is separate from the controlled-access road. The first end location may be one of an area designated for parking or a shoulder of a road different than the controlled-access road.

The instructions may further include to select the first end location based on a distance from the present location of the vehicle to the first end location and based on a lack of hazards from a hazard list at the first end location. The hazard list may include presence of a construction zone.

A first minimal risk maneuver on the list of minimal risk maneuvers may be traveling to a first end location, and the instructions may further include to select the first end location such that the first end location is on a shoulder of a road on which the vehicle is currently traveling. The instructions may further include to select the first end location based on a distance from the present location of the vehicle to the first end location and on a lack of hazards from a hazard list at the first end location. The hazard list may include a presence of at least one of a pedestrian or a stopped vehicle at the preselected location.

A first minimal risk maneuver on the list of minimal risk maneuvers may be stopping the vehicle in a current lane of travel.

The set of anomalous conditions may include failure of one or more components of the vehicle.

A method includes ranking a list of minimal risk maneuvers for a vehicle by expected risk score; for each minimal risk maneuver, updating a distance from a present location of the vehicle to an end location, wherein each end location satisfies a minimal risk condition corresponding to the respective minimal risk maneuver; in response to a first anomalous condition from a set of anomalous conditions, determining a distance limit based on the first anomalous condition; then selecting the minimal risk maneuver ranked best for the expected risk score from the minimal risk maneuvers for which the respective distances are below the distance limit; and then instructing the vehicle to perform the selected minimal risk maneuver.

With reference to FIGS. 1 and 2, a computer 32 includes a processor and a memory storing instructions executable by the processor. The instructions include to rank a list 34 of minimal risk maneuvers 36, 38, 40, 42, 44 for a vehicle 30 by expected risk score 46; for each minimal risk maneuver 36, 38, 40, 42, 44, update a distance 48 from a present location 50 of the vehicle 30 to a respective end location 52, 54, 56, 58, 60, wherein each end location 52, 54, 56, 58, 60 satisfies a minimal risk condition corresponding to the respective minimal risk maneuver 36, 38, 40, 42, 44; in response to a first anomalous condition selected from a set of anomalous conditions, determine a distance limit based on the first anomalous condition; then select the minimal risk maneuver 36, 38, 40, 42, 44 ranked best for the expected risk score 46 from the minimal risk maneuvers 36, 38, 40, 42, 44 for which the respective distances 48 are below the distance limit; and then instruct the vehicle 30 to perform the selected minimal risk maneuver 36, 38, 40, 42, 44.

With reference to FIG. 1, the vehicle 30 may be any passenger or commercial automobile such as a car, a truck, a sport utility vehicle, a crossover, a van, a minivan, a taxi, a bus, etc.

The vehicle 30 is an autonomous or semi-autonomous vehicle. The computer 32 is programmed to operate the vehicle 30 independently of the intervention of a human driver, completely or to a lesser degree. The computer 32 may be programmed to operate a propulsion 62, a steering system 64, a brake system 66, and/or other vehicle systems based on data received from sensors 68. For the purposes of this disclosure, an autonomous mode means the computer 32 controls the propulsion 62, steering system 64, and brake system 66 without input from a human driver; a semi-autonomous mode means the computer 32 controls one or two of the propulsion 62, steering system 64, and brake system 66 and a human driver controls the remainder; and a nonautonomous mode means a human driver controls the propulsion 62, steering system 64, and brake system 66. In particular, the computer 32 is programmed to operate the vehicle 30 in a Level 3 autonomous mode, meaning that the computer 32 can operate the vehicle 30 in the autonomous mode in certain environments, e.g., a controlled-access road 80 such as an interstate highway, and not in other environments, e.g., surface roads 82.

The computer 32 is a microprocessor-based computing device, e.g., an electronic controller or the like. The computer 32 can include a processor, a memory, etc. The memory of the computer 32 includes media for storing instructions executable by the processor as well as for electronically storing data and/or databases. The computer 32 can be multiple computers coupled together and/or could include one or more vehicle controllers, e.g., electronic control units (ECUs) or the like. Alternatively or additionally, the computer 32 could execute program instructions implemented in hardware, e.g., hardware such as a Field-Programmable Gate Array (FPGA), Application-Specific Integrated Circuit (ASIC), System-On-Chip (SOC), etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging.

The computer 32 may transmit and receive data through a communications network 70 such as a controller area network (CAN) bus, Ethernet, WiFi, Local Interconnect Network (LIN), onboard diagnostics connector (OBD-II), and/or by any other wired or wireless communications network. The computer 32 may be communicatively coupled to the propulsion 62, the steering system 64, the brake system 66, the sensors 68, a transceiver 72, and other components via the communications network 70.

The propulsion 62 of the vehicle 30 generates energy and translates the energy into motion of the vehicle 30. The propulsion 62 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 62 can include an electronic control unit (ECU) or the like that is in communication with and receives input from the computer 32 and/or a human driver. The human driver may control the propulsion 62 via, e.g., an accelerator pedal and/or a gear-shift lever.

The steering system 64 is typically a conventional vehicle steering subsystem and controls the turning of the wheels. The steering system 64 may be a rack-and-pinion system with electric power-assisted steering, a steer-by-wire system, as both are known, or any other suitable system. The steering system 64 can include an electronic control unit (ECU) or the like that is in communication with and receives input from the computer 32 and/or a human driver. The human driver may control the steering system 64 via, e.g., a steering wheel.

The brake system 66 is typically a conventional vehicle braking subsystem and resists the motion of the vehicle 30 to thereby slow and/or stop the vehicle 30. The brake system 66 may include friction brakes such as disc brakes, drum brakes, band brakes, etc.; regenerative brakes; any other suitable type of brakes; or a combination. The brake system 66 can include an electronic control unit (ECU) or the like that is in communication with and receives input from the computer 32 and/or a human driver. The human driver may control the brake system 66 via, e.g., a brake pedal.

The sensors 68 may provide data about operation of the vehicle 30, for example, wheel speed, wheel orientation, and engine and transmission data (e.g., temperature, fuel consumption, etc.). The sensors 68 may detect the location and/or orientation of the vehicle 30. For example, the sensors 68 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 68 may detect the external world, e.g., objects and/or characteristics of surroundings of the vehicle 30, such as other vehicles, road lane markings, traffic lights and/or signs, pedestrians, etc. For example, the sensors 68 may include radar sensors, scanning laser range finders, light detection and ranging (LIDAR) devices, and image processing sensors such as cameras.

The transceiver 72 may be adapted to transmit signals wirelessly through any suitable wireless communication protocol, such as Bluetooth®, WiFi, IEEE 802.11a/b/g, other RF (radio frequency) communications, etc. The transceiver 72 may be adapted to communicate with a remote server 90, that is, a server distinct and spaced from the vehicle 30. The remote server 90 may be located outside the vehicle 30. For example, the remote server 90 may be associated with a provider of a type of data such as map data, another vehicle (e.g., V2V communications), an infrastructure component (e.g., V2I communications via Dedicated Short-Range Communications (DSRC) or the like), a first responder, a mobile device associated with the owner of the vehicle 30, etc. The transceiver 72 may be one device or may include a separate transmitter and receiver.

With reference to FIG. 2, the list 34 includes a plurality of minimal risk maneuvers 36, 38, 40, 42, 44. Each minimal risk maneuver 36, 38, 40, 42, 44 has a corresponding minimal risk condition and a corresponding end location 52, 54, 56, 58, 60 at which the minimal risk condition is satisfied (shown in FIG. 3). For purposes of this disclosure, "minimal risk condition" has the meaning accorded by the National Highway Traffic Safety Administration (NHTSA) and the Society of Automotive Engineers (SAE): "'Minimal risk condition' means low-risk operating condition that an automated driving system automatically resorts to either when a system fails or when the human driver fails to respond appropriately to a request to take over the dynamic driving task." (U.S. Dept. of Transportation & NHTSA, Automated Driving Systems 2.0: A Vision for Safety, at 26 (citing SAE International J3016, International Taxonomy and Definitions for Terms Related to Driving Automation Systems for On-Road Motor Vehicles (J3016:September2016)).) For the purposes of this disclosure, a "minimal risk maneuver" is a driving operation having a goal of putting the vehicle 30 in a minimal risk condition. Each minimal risk maneuver 36, 38, 40, 42, 44 ends at the corresponding end location 52, 54, 56, 58, 60.

FIG. 3 is a diagram illustrating a plurality of minimal risk maneuvers 36, 38, 40, 42, 44 and respective end locations 52, 54, 56, 58, 60. The list 34 can include a first minimal risk maneuver 36, a second minimal risk maneuver 38, a third minimal risk maneuver 40, a fourth minimal risk maneuver 42, and a fifth minimal risk maneuver 44. For each minimal risk maneuver 36, 38, 40, 42, 44, the list 34 includes the respective expected risk score 46 and the distance 48 from the present location 50 of the vehicle 30 to the respective end location 52, 54, 56, 58, 60, both of which are described below with respect to the process 400.

The first minimal risk maneuver 36 can be stopping the vehicle 30 gradually in a current lane 74 of travel on a road 80, 82 on which the vehicle 30 is currently traveling. The minimal risk condition corresponding to the first minimal risk maneuver 36 is the vehicle 30 being stopped in a lane 74, 76. The first end location 52 is a location in the current lane 74 of travel at a distance from the present location 50 determined by a first preset braking force.

The second minimal risk maneuver 38 can be stopping the vehicle 30 quickly in the current lane 74 of travel. The braking force applied by the brake system 66 in the second minimal risk maneuver 38 can be a second preset braking force that is greater, e.g., approximately three times greater, than the first preset braking force. The minimal risk condition corresponding to the second minimal risk maneuver 38 is the vehicle 30 being stopped in a lane 74, 76. The second end location 54 is a location in the current lane 74 of travel at a distance from the present location 50 determined by the second preset braking force.

The third minimal risk maneuver 40 can be changing lanes and stopping in an adjacent lane 76 to the current lane 74 of travel. The minimal risk condition corresponding to the third minimal risk maneuver 40 is being stopped in a lane 74, 76. The third end location 56 is a location in the adjacent lane 76 to the current lane 74 of travel at a distance down the road 80, 82 from the present location 50 determined by how far the vehicle 30 will travel while changing lanes and then braking to a stop.

The fourth minimal risk maneuver 42 can be stopping on a shoulder 78 of the road 80, 82 on which the vehicle 30 is currently traveling. The minimal risk condition corresponding to the fourth minimal risk maneuver 42 is being stopped on the shoulder 78. The fourth end location 58 is a location on the shoulder 78 of the road 80, 82.

The fifth minimal risk maneuver 44 can be traveling from the controlled-access road 80 on which the vehicle 30 is currently traveling to the fifth end location 60. The autonomous mode can be restricted to controlled-access roads 80, so the fact that the vehicle 30 is in the autonomous mode implies that the vehicle 30 is traveling on a controlled-access road 80. The minimal risk condition corresponding to the fifth minimal risk maneuver 44 is being stopped at a location separated from the controlled-access road 80. The fifth end location 60 is one of an area 88 designated for parking or the shoulder 78 of a road 82 different than the controlled-access road 80.

The first through fifth minimal risk maneuvers 36, 38, 40, 42, 44 on the list 34 are exemplary, and the list 34 could exclude some or all of the first through fifth minimal risk maneuvers 36, 38, 40, 42, 44; include other minimal risk maneuvers; and/or include a different number of minimal risk maneuvers. Other possible minimal risk maneuvers include stopping in the current lane 74 of travel with a braking force selected based on an estimated stopping distance of a vehicle following the vehicle 30, traveling to and stopping in a median crossing, traveling to and stopping at a final destination chosen before the trip, traveling to a particular type of location such as a vehicle service station or a hospital, etc.

Figure 4:
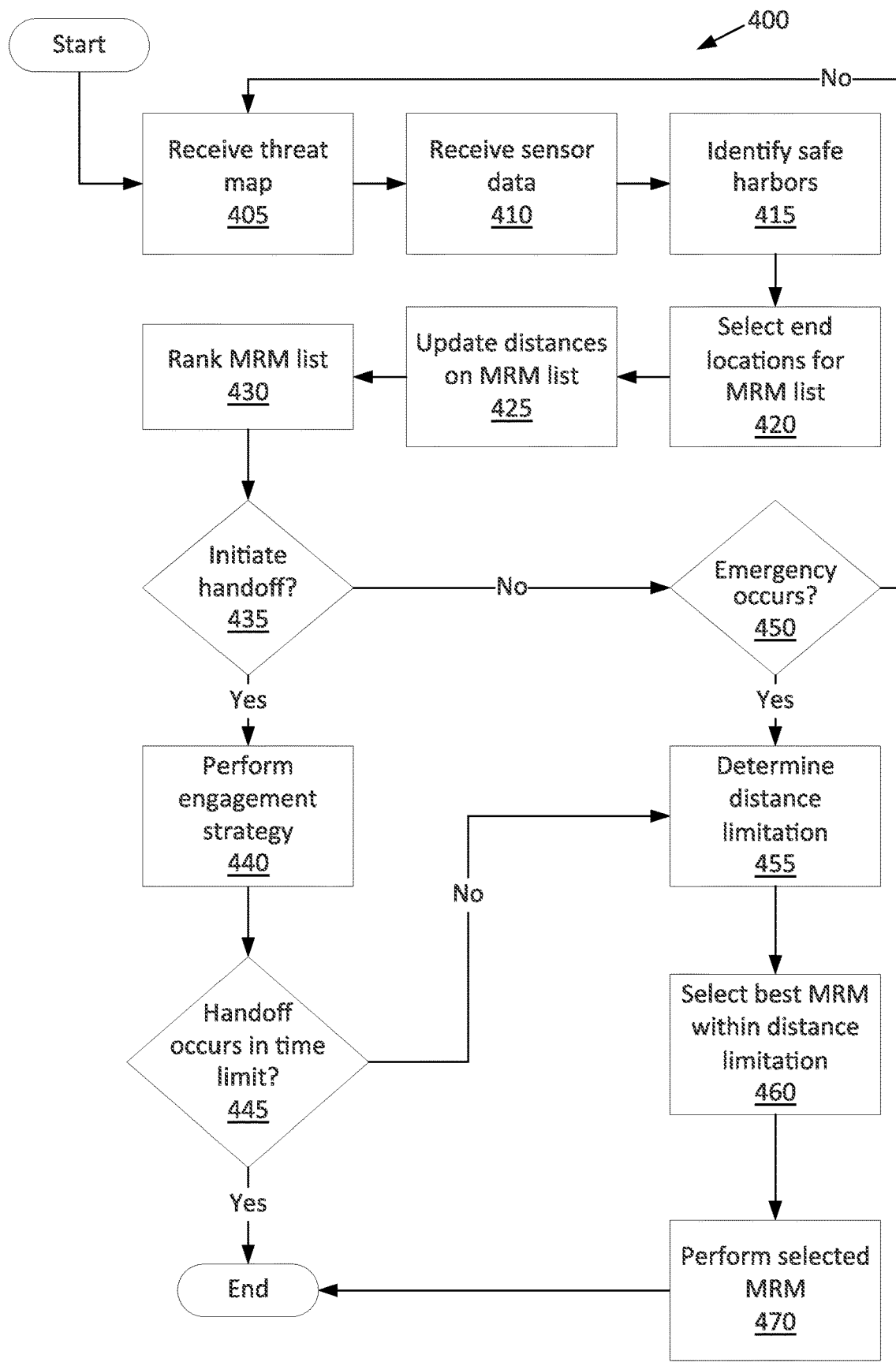
FIG. 4 is a process flow diagram of an example process for selecting one of the minimal risk maneuvers.

FIG. 4 is a process flow diagram illustrating an exemplary process 400 for selecting one of the minimal risk maneuvers 36, 38, 40, 42, 44. The memory of the computer 32 stores executable instructions for performing the steps of the process 400. The process 400 is run when the computer 32 is operating the vehicle 30 in the autonomous mode. If the vehicle 30 is operating nonautonomously or semi-autonomously, then the process 400 does not run. As a general overview of the process 400, the computer 32 receives map data including hazards; receives data from the sensors 68; identifies eligible areas 84 for the fourth end location 58 and fifth end location 60; selects the end locations 52, 54, 56, 58, 60 from the map data; updates distances 48 to the end locations 52, 54, 56, 58, 60 on the list 34 of minimal risk maneuvers 36, 38, 40, 42, 44; ranks the minimal risk maneuvers 36, 38, 40, 42, 44 by expected risk score 46; initiates a handoff of control of the vehicle 30 to the driver if an operating condition for the autonomous mode is not met; and in response to the handoff failing to occur within a time limit or another anomalous condition occurring, determines a distance limit based on the type of anomaly, then selects the minimal risk maneuver 36, 38, 40, 42, 44 ranked best for the expected risk score 46 from the minimal risk maneuvers 36, 38, 40, 42, 44 for which the respective distances 48 are below the distance limit, and then performing the selected minimal risk maneuver 36, 38, 40, 42, 44.

The process 400 begins in a block 405, in which the computer 32 receives map data, e.g., from the remote server 90 via the transceiver 72. The map data can take the form of an update to map data already stored on the memory of the computer 32. The map data includes indications of hazards from a hazard list. The hazard list can include presence of a construction zone 86, presence of a pedestrian or a stopped vehicle 30 on the shoulder 78, closure of the shoulder 78, closure of the road 80, 82, etc.

Next, in a block 410, the computer 32 receives data from the sensors 68. The data from the sensors 68 includes image data, LIDAR data, etc.

Next, in a block 415, the computer 32 determines eligible areas 84 for at least one of the end locations 52, 54, 56, 58, 60. For example, the computer 32 can determine eligible areas 84 for the fourth end location 58 and for the fifth end location 60. The computer 32 uses the map data and the sensor data to determine the eligible areas 84. The computer 32 determines the eligible areas 84 based on (1) satisfying the respective minimal risk conditions and (2) a lack of hazards from the hazard list. For the fourth end location 58, the eligible areas 84 satisfy the minimal risk condition by being shoulders 78 of the controlled-access road 80 on which the vehicle 30 is currently traveling. For the fifth end location 60, the eligible areas 84 satisfy the minimal risk condition by being an area 88 designated for parking or a shoulder 78 of a road 82 different than the controlled-access road 80. The lack of hazards from the hazard list can be a lack of a subset of hazards from the hazard list, and the subset can be different for each end location 58, 60. For the fourth end location 58, the subset of the hazard list can include presence of a construction zone 86, presence of a pedestrian or a stopped vehicle on the shoulder 78, closure of the shoulder 78, and closure of the road 80, 82. In the example illustrated in FIG. 3, the vehicle 30 is currently traveling through a construction zone 86, and the eligible area 84 is therefore farther along the road 80, 82 than the construction zone 86. For the fifth end location 60, the subset of the hazard list can include presence of a construction zone 86, closure of the shoulder 78, and closure of the road 80, 82.

Next, in a block 420, the computer 32 selects the end locations 52, 54, 56, 58, 60 from the map data. Each end location 52, 54, 56, 58, 60 satisfies the minimal risk condition corresponding to the respective minimal risk maneuver 36, 38, 40, 42, 44. The computer 32 selects the first end location 52, the second end location 54, and the third end location 56 based on the distance needed to perform the respective minimal risk maneuver 36, 38, 40. The computer 32 selects the fourth end location 58 and fifth end location 60 based on a distance from the present location 50 of the vehicle 30 to the respective end location 58, 60 and based on a lack of hazards from the hazard list at the respective end location 58, 60, i.e., based on being at an eligible area 84 as determined in the block 415. For example, the computer 32 selects the fourth end location 58 to minimize a distance to travel from the present location 50 of the vehicle 30 to one of the eligible areas 84, i.e., the fourth end location 58 is a closest portion of the eligible areas 84. For another example, the computer 32 selects the fifth end location 60 to minimize a distance to travel from the present location 50 of the vehicle 30 to, if available, an eligible area 84 that is an area 88 designated for parking, or, otherwise, an eligible area 84 that is a shoulder 78 of a road 82 separate from the controlled-access road 80.

Next, in a block 425, the computer 32 updates the distances 48 from the present location 50 of the vehicle 30 to the end locations 52, 54, 56, 58, 60. Each distance 48 is a path length that the vehicle 30 would travel from the present location 50 to the respective end location 52, 54, 56, 58, 60 while performing the respective minimal risk maneuver 36, 38, 40, 42, 44.

Next, in a block 430, the computer 32 ranks the list 34 of minimal risk maneuvers 36, 38, 40, 42, 44 by the expected risk score 46. For the purposes of this disclosure, an "expected risk score" is a rating or evaluation of risk to occupants of the vehicle 30. The expected risk score 46 for each minimal risk maneuver 36, 38, 40, 42, 44 specifies a risk from performing the minimal risk maneuver 36, 38, 40, 42, 44 and risk from being stopped at the end location 52, 54, 56, 58, 60. The expected risk score 46 can be determined by using functional risk assessment, i.e., a combination of a measure of probability of an accident and a measure of severity of the accident. The minimal risk maneuvers 36, 38, 40, 42, 44 are ranked from best (lowest risk) to worst (highest risk).

For example, the expected risk score 46 can be based on probability and severity that come from actuarial data for the controlled-access road 80 on which the vehicle 30 is traveling or for roads of the same type, e.g., four-lane controlled-access road with median, six-lane controlled-access road with barrier and no median, etc. If a hazard from the hazard list is present along the minimal risk maneuver 36, 38, 40, 42, 44, then the actuarial data can be for roads of the same type having that hazard, e.g., four-lane controlled-access road with median and with right shoulder closed by construction zone 86. The expected risk score 46 can be the product of the probability from the actuarial data multiplied by a score of the severity from the actuarial data. The minimal risk maneuvers 36, 38, 40, 42, 44 can then be ranked from the lowest score to the highest score.

For another example, the expected risk score 46 can be a version of the automotive safety integrity level (ASIL), modified to apply to maneuvers and stopping locations of the vehicle 30 rather than to components of the vehicle 30. The expected risk score 46 can be a combination of three ratings: controllability rated from C0 (controllable in general) to C3 (difficult to control or uncontrollable), exposure from E0 (incredibly low probability) to E4 (high probability), and severity from S0 (no injuries) to S3 (life-threatening injuries). The computer 32 can score controllability ratings, exposure ratings, and severity ratings for maneuvering along each type of road 80, 82, e.g., four-lane controlled-access road with median, six-lane controlled-access road with barrier and no median, etc., as well as modifications for each hazard on the hazard list, e.g., increasing the controllability rating by one level (C1 to C2, C2 to C3, etc.) for the presence of a construction zone 86. The table below shows how each combination of controllability rating, exposure rating, and severity rating provides an expected risk score 46 of QM (lowest risk), A, B, C, or D (highest risk). For example, the first minimal risk maneuver 36 can have ratings of (C3, E3, S2) for an expected risk score 46 of B, the second minimal risk maneuver 38 can have ratings of (C3, E4, S2) for an expected risk score 46 of C, the third minimal risk maneuver 40 can have ratings of (C3, E3, S2) for an expected risk score 46 of B, the fourth minimal risk maneuver 42 can have ratings of (C3, E2, S2) for an expected risk score 46 of A, and the fifth minimal risk maneuver 44 can have ratings of (C3, E1, S0) for an expected risk score 46 of QM. The minimal risk maneuvers 36, 38, 40, 42, 44 can then be ranked from lowest risk to highest risk. If two minimal risk maneuvers 36, 38, 40, 42, 44 have the same expected risk score 46, the tie can be broken by the lowest respective distance 48.

TABLE 1

| | | Severity | | | |
|---|---|---|---|---|---|
| Controllability | Exposure | S0 | S1 | S2 | S3 |
| C1 | E1 | QM | QM | QM | QM |
| | E2 | QM | QM | QM | QM |
| | E3 | QM | QM | QM | A |
| | E4 | QM | QM | A | B |
| C2 | E1 | QM | QM | QM | QM |
| | E2 | QM | QM | QM | A |
| | E3 | QM | QM | A | B |
| | E4 | QM | A | B | C |
| C3 | E1 | QM | QM | QM | A |
| | E2 | QM | QM | A | B |
| | E3 | QM | A | B | C |
| | E4 | QM | B | C | D |

Next, in a decision block 435, the computer 32 determines whether a trigger has occurred for handing off control of the vehicle 30 to the human driver. For the purposes of this disclosure, a "trigger" is a situation stored in the memory of the computer 32 that indicates that some action should be performed, in this case, handing off control of the vehicle 30 to the human driver. For example, the trigger can be that the vehicle 30 will enter an area that fails to satisfy at least one operating condition for the autonomous mode. For the purposes of this disclosure, an "operating condition" for a mode is defined as a necessary condition of the environment for the vehicle 30 to operate in the mode. For example, the operating conditions for the autonomous mode can include traveling on a particular road type such as a controlled-access road 80, a lack of hazards such as a lack of a construction zone 86, etc. The trigger can be a distance threshold or time-of-travel threshold to reach the area that fails to satisfy all the operating conditions. The threshold can be chosen based on experimentally testing how long drivers typically take to reestablish control of the vehicle 30. For example, the computer 32 determines that the trigger has occurred when the vehicle 30 is within a distance threshold of a planned exit from the controlled-access road 80 or within the distance threshold of a construction zone 86. If a trigger has occurred, the process 400 proceeds to a block 440. If no trigger has occurred, the process 400 proceeds to a decision block 450.

In the block 440, the computer 32 prompts the driver to reengage control of the vehicle 30. For example, the computer 32 can display a message or visual indication on a screen or dashboard of the vehicle 30, generate a warning sound such as repeated beeping, provide haptic feedback by vibrating a seat of the driver, etc.

As an overview of the decision blocks 445 and 450, the computer 32 determines whether an anomalous condition from a set of anomalous conditions has occurred. The set of anomalous conditions includes a failure of the driver to reengage control of the vehicle 30 from the autonomous mode within a time limit, which is assessed in the decision block 445. The set of anomalous conditions also includes other anomalous conditions unconnected to handoff to the driver, which are assessed in the decision block 450.

In the decision block 445, the computer 32 determines whether the driver has failed to reengage control of the vehicle 30 from the autonomous mode within the time limit. The time limit is chosen based on experimentally determining a distribution of times for the driver to respond and reengage control of the vehicle 30. If the driver reengages control of the vehicle 30 within the time limit, the process 400 ends. If the driver fails to reengage control of the vehicle 30 within the time limit, the process 400 proceeds to a block 455.

In the decision block 450, the computer 32 determines whether any of the set of anomalous conditions has occurred. The set of anomalous conditions includes failure of one or more components of the vehicle 30, an imminent impact to the vehicle 30, an impact to the vehicle 30, etc. If no anomalous conditions have occurred, the process 400 returns to the block 405 to continue receiving map and sensor data. If at least one anomalous condition has occurred, the process 400 proceeds to the block 455.

In the block 455, the computer 32 determines a distance limit based on the type of the anomalous condition and, if the anomalous condition was failure to reengage by the driver, the distance limit is additionally based on the cause of the handoff. The memory of the computer 32 can store a lookup table having the anomalous condition paired with a respective distance limit, e.g., as shown below in Table 2. Each of the distance limits in the table can be chosen based on how much the respective anomalous condition permits the vehicle 30 to be operated in the autonomous mode. For example, if the vehicle 30 is an electric vehicle, the distance limit corresponding to a failure of a main battery of the vehicle 30 is chosen based on a capacity of a backup battery of the vehicle 30. For another example, the distance limit corresponding to a failure of sensor-cleaning equipment is chosen based on a shortest expected distance for accumulated dirt to make the sensor unreliable.

TABLE 2

| Anomalous Condition | Distance limit |
|---|---|
| Failure of Main Battery | 400 m |
| Failure of Sensor-Cleaning Equipment | 10 km |
| Imminen Frontal Impact | 75 m |
| Handoff for Construction Zone | Distance to Construction Zone |
| Handoff for Exiting Controlled-Access Road | Distance to Exit + 5 km |
| . . . | . . . |

Next, in a block 460, the computer 32 selects the minimal risk maneuver ranked best for the expected risk score 46 from the minimal risk maneuvers 36, 38, 40, 42, 44 for which the respective distances 48 are below the distance limit determined in the block 455. For example, if the anomalous condition in the block 450 is failure of sensor-cleaning equipment, the distance limit is 10 km. The respective distances 48 for all the minimal risk maneuvers 36, 38, 40, 42, 44 on the list 34 are below the distance limit, so the computer 32 selects the fifth minimal risk maneuver 44 because the expected risk score 46 is lowest (best) overall. For another example, if the anomalous condition is a failure of the main battery, the distance limit is 400 m, which excludes the fifth minimal risk maneuver 44. The computer 32 selects the fourth minimal risk maneuver 42 from among the first minimal risk maneuver 36 through the fourth minimal risk maneuver 42 because the expected risk score 46 of A is better than the expected risk scores 46 of B, C, and B for the first through third minimal risk maneuvers 36, 38, 40.

Next, in a block 470, the computer 32 instructs the vehicle 30 to perform the selected minimal risk maneuver 36, 38, 40, 42, 44. Specifically, the computer 32 instructs the propulsion 62, steering system 64, and brake system 66 to autonomously operate the vehicle 30 to perform the selected minimal risk maneuver 36, 38, 40, 42, 44. Additionally, the computer 32 may activate external warning lights of the vehicle 30. After the block 470, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," "third," "fourth," and "fifth" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   rank a list of minimal risk maneuvers for a vehicle by expected risk score;
   for each minimal risk maneuver in the list of the minimal risk maneuvers, update a distance from a present location of the vehicle to a respective end location, wherein each end location satisfies a minimal risk condition corresponding to the respective minimal risk maneuver;
   in response to a first anomalous condition selected from a set of anomalous conditions, determine a distance limit based on the first anomalous condition;
   then select the minimal risk maneuver ranked best for the expected risk score from the minimal risk maneuvers for which the respective distances are below the distance limit; and
   then instruct the vehicle to perform the selected minimal risk maneuver.

2. The computer of claim 1, wherein the set of anomalous conditions includes a failure of a driver to reengage control of the vehicle from an autonomous mode within a time limit.

3. The computer of claim 2, wherein the instructions further include to operate the vehicle in the autonomous mode, and to prompt the driver to reengage control of the vehicle upon determining that the vehicle will enter an area that fails to satisfy at least one operating condition for the autonomous mode.

4. The computer of claim 3, wherein the at least one operating condition is a road type.

5. The computer of claim 4, wherein the road type is a controlled-access road.

6. The computer of claim 3, wherein the operating condition is a lack of a construction zone.

7. The computer of claim 1, wherein the instructions further include, for at least one of the minimal risk maneuvers, to select the end location based on a distance from the present location of the vehicle to the end location and based on a lack of hazards from a hazard list at the end location.

8. The computer of claim 7, wherein the instructions further include to receive map data that includes indications of hazards from the hazard list.

9. The computer of claim 8, wherein the instructions further include to select the end locations from the map data.

10. The computer of claim 8, wherein the instructions further include to determine eligible areas for at least one end location based on a lack of hazards from the hazard list.

11. The computer of claim 1, wherein a first minimal risk maneuver on the list of minimal risk maneuvers is traveling from a controlled-access road on which the vehicle is currently traveling to a first end location, and the instructions further include to select the first end location such that the first end location is separate from the controlled-access road.

12. The computer of claim 11, wherein the first end location is one of an area designated for parking or a shoulder of a road different than the controlled-access road.

13. The computer of claim 11, wherein the instructions further include to select the first end location based on a distance from the present location of the vehicle to the first end location and based on a lack of hazards from a hazard list at the first end location.

14. The computer of claim 13, wherein the hazard list includes presence of a construction zone.

15. The computer of claim 1, wherein a first minimal risk maneuver on the list of minimal risk maneuvers is traveling to a first end location, and the instructions further include to select the first end location such that the first end location is on a shoulder of a road on which the vehicle is currently traveling.

16. The computer of claim 15, wherein the instructions further include to select the first end location based on a distance from the present location of the vehicle to the first end location and on a lack of hazards from a hazard list at the first end location.

17. The computer of claim 16, wherein the hazard list includes a presence of at least one of a pedestrian or a stopped vehicle at the first end location.

18. The computer of claim 1, wherein a first minimal risk maneuver on the list of minimal risk maneuvers is stopping the vehicle in a current lane of travel.

19. The computer of claim 1, wherein the set of anomalous conditions includes failure of one or more components of the vehicle.

20. A method comprising:
   ranking a list of minimal risk maneuvers for a vehicle by expected risk score;
   for each minimal risk maneuver in the list of the minimal risk maneuvers, updating a distance from a present location of the vehicle to an end location, wherein each end location satisfies a minimal risk condition corresponding to the respective minimal risk maneuver;
   in response to a first anomalous condition from a set of anomalous conditions, determining a distance limit based on the first anomalous condition;
   then selecting the minimal risk maneuver ranked best for the expected risk score from the minimal risk maneuvers for which the respective distances are below the distance limit; and
   then instructing the vehicle to perform the selected minimal risk maneuver.

* * * * *